United States Patent
Otosaka et al.

(10) Patent No.: US 8,322,165 B2
(45) Date of Patent: Dec. 4, 2012

(54) APPARATUS FOR FABRICATING AN OPTICAL FIBER

(75) Inventors: Tetsuya Otosaka, Annaka (JP); Yoshiaki Shimizu, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 886 days.

(21) Appl. No.: 12/189,440

(22) Filed: Aug. 11, 2008

(65) Prior Publication Data

US 2009/0038345 A1 Feb. 12, 2009

(30) Foreign Application Priority Data

Aug. 10, 2007 (JP) ................................. 2007-210173

(51) Int. Cl.
*C03B 37/029* (2006.01)

(52) U.S. Cl. ........................................................ 65/537

(58) Field of Classification Search ...................... 65/537
See application file for complete search history.

(56) References Cited

U.S. PATENT DOCUMENTS

| | | | |
|---|---|---|---|
| 4,314,837 A | 2/1982 | Blankenship | |
| 4,388,098 A | 6/1983 | Takahashi et al. | |
| 4,750,927 A | 6/1988 | Mizutani et al. | |
| 5,518,516 A | 5/1996 | Garnham | |
| 5,925,163 A | 7/1999 | Evans et al. | |
| 5,931,984 A | 8/1999 | Drouart et al. | |
| 6,253,580 B1 | 7/2001 | Gouskov et al. | |
| 6,672,110 B2 | 1/2004 | Roba et al. | |
| 6,715,321 B1 | 4/2004 | Ripoche et al. | |
| 2002/0092328 A1 | 7/2002 | Pedrido et al. | |
| 2003/0205068 A1* | 11/2003 | Taru et al. | ........................ 65/537 |
| 2006/0130524 A1 | 6/2006 | Hovinen et al. | |
| 2006/0280578 A1 | 12/2006 | Shiono | |

FOREIGN PATENT DOCUMENTS

| | | | |
|---|---|---|---|
| CN | 87105480 A | | 2/1988 |
| CN | 1239934 A | | 12/1999 |
| DE | 3903466 | * | 8/1990 |
| DE | 4006839 | * | 9/1991 |
| JP | 63-176330 A | | 7/1988 |
| JP | 63-310746 A | | 12/1988 |
| JP | 64-018929 A | | 1/1989 |
| JP | 2-47414 B2 | | 10/1990 |

(Continued)

OTHER PUBLICATIONS

Machine translation of Motter DE 3903466, 2011. 4 pages.*

(Continued)

*Primary Examiner* — John Hoffmann
(74) *Attorney, Agent, or Firm* — Westerman, Hattori, Daniels & Adrian, LLP (57) ABSTRACT

In an apparatus for fabricating an optical fiber, the apparatus includes a drawing furnace provided with an insertion opening for receiving an optical fiber perform, a feed mechanism configured to support one end of the optical fiber preform so as to feed into the drawing furnace, a first sealing unit configured to seal a clearance gap between the optical fiber preform and the insertion opening, and a second sealing unit configured to seal a gap between the optical fiber preform and the first sealing unit when a tapered portion formed at the one end side of the optical fiber preform passes through the insertion opening. As a result, the available entirety of the optical fiber preform can be changed to an optical fiber, so that the cost for fabricating the optical fiber can be significantly reduced.

7 Claims, 6 Drawing Sheets

FOREIGN PATENT DOCUMENTS

| | | | |
|---|---|---|---|
| JP | 03-126634 | A | 5/1991 |
| JP | 4-79981 | B2 | 12/1992 |
| JP | 05-105470 | A | 4/1993 |
| JP | 6-092669 | A | 4/1994 |
| JP | 06-199536 | A | 7/1994 |
| JP | 2000-044276 | A | 2/2000 |
| JP | 2000-264670 | A | 9/2000 |
| JP | 2004-161563 | A | 6/2004 |
| JP | 2004-210621 | A | 7/2004 |
| JP | 2005-8475 | A | 1/2005 |
| JP | 2006-248842 | A | 9/2006 |
| JP | 2006-342030 | A | 12/2006 |
| JP | 2007-070187 | A | 3/2007 |
| JP | 2007-070189 | A | 3/2007 |
| WO | 98/25861 | A1 | 6/1998 |
| WO | 2004/113243 | A1 | 12/2004 |
| WO | 2006/106068 | A2 | 10/2006 |

OTHER PUBLICATIONS

European Search Report dated Feb. 17, 2011, issued in corresponding European Patent Application No. 08014221.9.
Korean Office Action dated Apr. 5, 2010, issued in corresponding Korean Patent Application No. 10-2008-0077283.
Japanese Office Action date Aug. 16, 2011, issued in corresponding Japanese Patent Application No. 2008-134585.
Chinese Office Actioin dated Mar. 9, 2011, issued in corresponding Chinese Patent Application No. 200810134932.
Chinese Office Action dated Dec. 7, 2010, issued in corresponding Chinese Patent Application No. 200810097792.3.
European Search Report dated Mar. 2, 2011, issued in corresponding European Application No. 08009750.4.
Japanese Office Action dated Jan. 27, 2012, issued in corresponding Japanese Patent Application No. 2008-203258.

\* cited by examiner

APPARATUS FOR FABRICATING AN OPTICAL FIBER

CROSS-REFERENCE TO RELATED APPLICATIONS AND INCORPORATION BY REFERENCE

This application claims the benefit of Japanese Patent Application No. 2007-210173, filed Aug. 10, 2007, which is hereby incorporated by reference herein in its entirety.

BACKGROUND OF THE INVENTION

1. Field of the Invention

The invention relates to an apparatus for fabricating an optical fiber and a method for sealing a drawing furnace used in a drawing of the optical fiber, which is suitable for drawing a optical fiber preform with no grip portion having a constant diameter.

2. Description of the Related Art

An optical fiber is fabricated by heating and melting a distal end of a silica glass rod so-called an optical fiber preform (hereinafter simply referred as a preform) while moving downwardly, and drawing an optical fiber from the melted distal end of the preform. The interior of a drawing furnace when fabricating the optical fiber reaches a temperature of about 2000 degrees C., i.e. immensely-high, so that carbon is generally used as a material for elements such as a furnace core tube as a heater. To prevent the carbon from erosion by oxidization, it is required to maintain the interior of the drawing furnace with an inert gas atmosphere such gases as argon, helium or the like, and control external air flow into the interior of the drawing furnace.

In a conventional way, to control external air flowing into the drawing furnace, a gas sealing ring with an inner diameter corresponding to an outer diameter of the preform is arranged at a preform insertion opening so as to provide a small clearance gap between the preform insertion opening and the preform. On the other hand, if a fluctuation of the outer diameter of the preform is bigger than some extent, at the top end of the drawing furnace, the clearance gap between the preform and the gas sealing ring can be significantly changed in size in response to the fluctuation of the outer diameter of the preform when drawing the optical fiber, depending on the position of the preform. The fluctuation of the clearance gap in size causes a change of the flow of the inert gas supplied into the drawing furnace, so that it is impossible to control the outer diameter of the optical fiber. Additionally, if the size of the clearance gap becomes larger than a predetermined value, external air flows into the interior of the drawing furnace will erode the carbon element(s) by oxidization. As a result, dust from an eroded portion adheres to a melted portion of the glass preform 1. The adhered dust causes a localized fluctuation of the outer diameter and localized embrittlement of the optical fiber 5, as well as a decrease in the life of the carbon part of the drawing furnace, so that the optical characteristic and the strength of the optical fiber might degrade.

To avoid the above problem, a preform with a finely adjusted outer diameter is generally used. To obtain the preform having a finely adjusted outer diameter, first, a deposition process, such as a Vapor-phase Axial Deposition (VAD) process or an Outside Vapor Deposition (OVD) process, is conducted to produce a porous glass preform. Next, the porous glass preform is heated so as to sinter the preform and produce a transparent vitrified glass preform with a relatively large fluctuation in its outer diameter in the longitudinal direction. Finally, the transparently vitrified glass preform is heated and drawn so as to achieve the preform with a smaller and a finely adjusted outer diameter.

To change an entire preform to an optical fiber, for example, a dummy rod or a dummy tube with the same outer diameter as that of the preform is connected to the proximal end of the preform. The dummy-portion is supported by a feed mechanism for feeding the preform into a drawing furnace. As a result, it is possible to boost yield in fabricating an optical fiber by heating the entire preform from its distal end to its proximal end at a central area of the drawing furnace so as to make an optical fiber.

However, if conducting the above discussed heating and drawing process for finely adjusting the outer diameter of the preform or using the dummy rod or dummy tube increases the cost. To avoid the additional cost, it is required to draw an optical fiber directly from a preform which is not subject to a drawing process and has fluctuation in its outer diameter.

Figure 1:
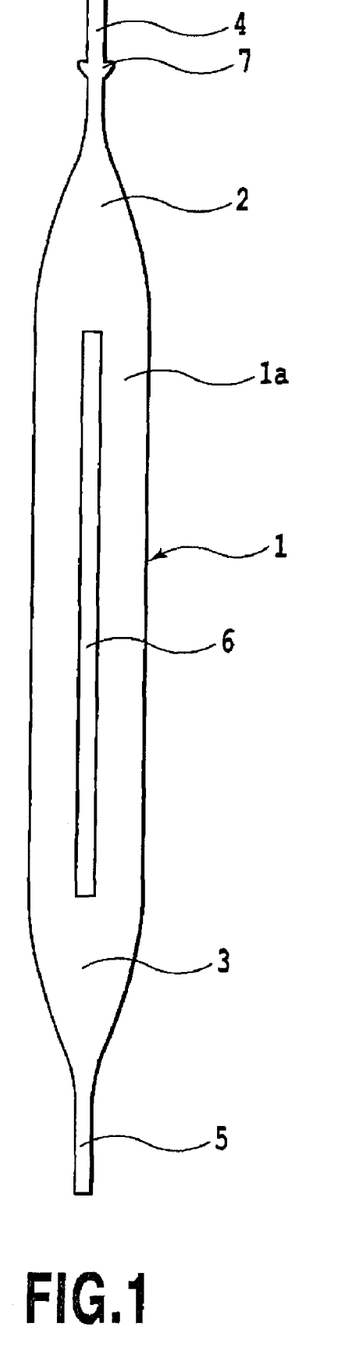
FIG. 1 is a schematic view of an example of a structure of an optical fiber preform.

FIG. 1 schematically illustrates a structure of a preform produced by the VAD process or the OVD process. The preform 1 has a constant diameter portion 1a, tapered portions 2 and 3 with a length of from about 10 mm to 500 mm at both end portions, and a core 6. The core 6 is in the constant diameter portion 1a, but is not in the tapered portions 2 and 3. The outer diameter of the constant diameter portion 1a is typically from 10 mm to 200 mm and has an outer diameter fluctuation of from several millimeters to several tens of millimeters. The tapered portions 2 and 3 have gripped portions 4 and 5 at their ends, respectively. The diameter of the gripped portions 4 and 5 is typically from 20 mm to 70 mm. The gripped portions 4 has a projection 7 engaged with a transfer jig when transferring the preform 1.

To change the entire preform 1 to an optical fiber, external air must be prevented from flowing into the drawing furnace when the tapered portion 2 at the proximal side of the preform 1 passes through an insertion opening of the drawing furnace.

However, a clearance gap formed between the insertion opening and the tapered portion 2 is too big so that it is difficult to efficiently seal the clearance gap with only a gas sealing ring arranged at the insertion opening. An inefficient seal of the clearance gap causes external air to flow into the drawing furnace when making an optical fiber so that the optical characteristic or the strength of the optical fiber might degrade.

For example, Japanese Patent Laid-open No. 2006-342030 (corresponding to US 2006/280578A1) discloses a method capable of sealing a gap between an insertion opening of a drawing furnace and a preform in response to a fluctuation in the outer diameter of the preform. The method comprises pushing a sealing ring, formed of a combination of an inner ring and an outer ring respectively configured with a plurality of mutually connected seal ring fragments, onto a surface of a glass preform. Elastic springs are arranged on a periphery of the outer ring.

In this method, however, a sealable fluctuation range of the outer diameter, which the sealing ring can efficiently seal, is limited to a predetermined value. As a result, efficient seal can not be provided with regard to a preform with a tapered portion having a wide fluctuation range of its outer diameter.

Japanese Patent Laid-open No. 2007-70189 discloses a sealing member which is provided with a brush and arranged at an insertion opening. However, an effective sealable fluctuation range of the outer diameter of a preform is also limited to a predetermined value, so that an efficient seal can not be provided with regard to a preform with a tapered portion having a wide fluctuation range of its outer diameter.

A method for drawing an optical fiber from the foregoing preform is known in which the entire of the preform is covered by a sealed chamber (a top chamber) disposed on a top end of a drawing furnace. However, in this method, to move the preform hung in the top chamber into the drawing furnace, a very long shaft for supporting the preform is needed and the overall height of the apparatus is very long.

To avoid those problems, Japanese Patent Laid-open No. 63-176330 discloses a top chamber configured with bellows which can elongate and contract.

However, because the bellows are repeatedly extended and contracted under a high temperature, they might break or generate dust. Additionally, a heater which can reach a temperature of over 2000 degrees C. is arranged below the top chamber, so that a strong convection is generated in the top chamber and a gas flow is disturbed in the vicinity of the melted of the preform. As a result, a large fluctuation of the outer diameter of the drawn optical fiber might be generated.

SUMMARY OF THE INVENTION

It is an object of the present invention is to provide an apparatus for fabricating an optical fiber capable of changing an entire available optical fiber preform to an optical fiber by effectively sealing a clearance gap between a tapered portion at a proximal end side of an optical fiber preform to be drawn and a preform insertion opening of a drawing furnace.

It is another object of the present invention is to provide a method for sealing a drawing furnace which can effectively seal the clearance gap between the tapered portion and the insertion opening.

The apparatus for fabricating an optical fiber according to the present invention includes a drawing furnace provided with an insertion opening for receiving an optical fiber preform, a feed mechanism configured to support one end of the optical fiber preform so as to feed into the drawing furnace, a first sealing unit configured to seal a clearance gap between the optical fiber preform and the insertion opening, and a second sealing unit configured to seal a gap between the optical fiber preform and the first sealing unit when a tapered portion formed at the one end side of the optical fiber preform passes through the insertion opening.

The method for sealing a drawing furnace provided with an insertion opening for receiving an optical fiber preform according to the present invention includes a step of sealing a gap between the insertion opening and the optical fiber preform inserted into the insertion opening with a first sealing unit, and a step of placing a second sealing unit on the first sealing unit by a tapered portion formed at one end side of the optical fiber preform reaches onto the first sealing unit so as to seal a gap between the first sealing unit and the optical fiber preform.

According to the present invention, in a drawing of an optical fiber from an optical glass preform having tapered portions at both sides, it becomes possible to prevent external air from flowing into a drawing furnace and gas in the drawing furnace from outflowing therefrom, so that the cost for fabricating the optical fiber can be significantly reduced.

Further features of the present invention will become apparent from the following description of exemplary embodiments with reference to the attached drawings.

DESCRIPTION OF THE EMBODIMENTS

An embodiment of the present invention will be described below in detail with reference to the attached drawings.

Figure 2:
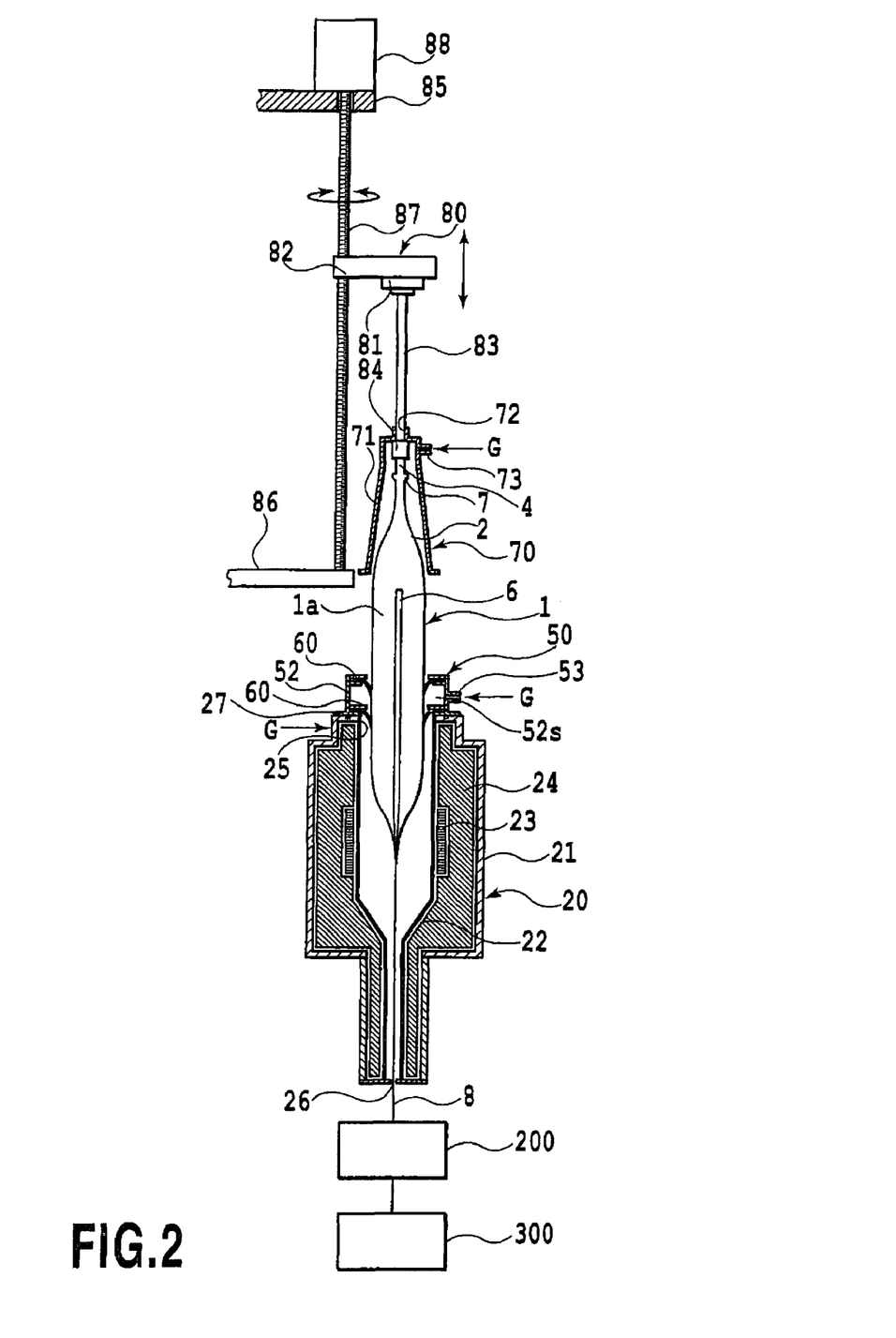
FIG. 2 is a schematic vertical sectional view of an apparatus for fabricating an optical fiber according to an embodiment of the present invention, which shows that a second sealing unit is located above a first sealing unit.

FIG. 2 illustrates an apparatus for fabricating an optical fiber according to an embodiment of the present invention. The apparatus has a drawing furnace 20, a first sealing unit 50, a second sealing unit 70, a feed mechanism 80, a resin coating device 200, and a winding device 300.

The drawing furnace 20 has a housing 21, a furnace core tube 22 disposed in the housing 21, a heat shield material 24 filled between the furnace core tube 22 and the housing 21, and is provided with an insertion opening 25 for receiving an optical fiber preform 1 at the top end of the housing 21 and a draw-out opening 26 for drawing out an optical fiber 8 drawn from the distal end of the optical fiber preform 1 at the bottom of the housing 21.

Figure 3A:
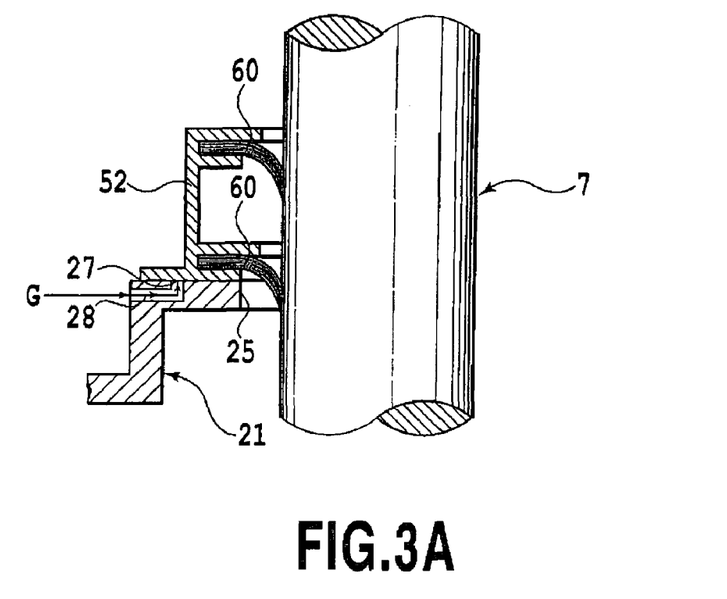
FIG. 3A is a cross sectional view of a structure in the vicinity of a gas ejecting nozzle shown in FIG. 2.
Figure 3B:
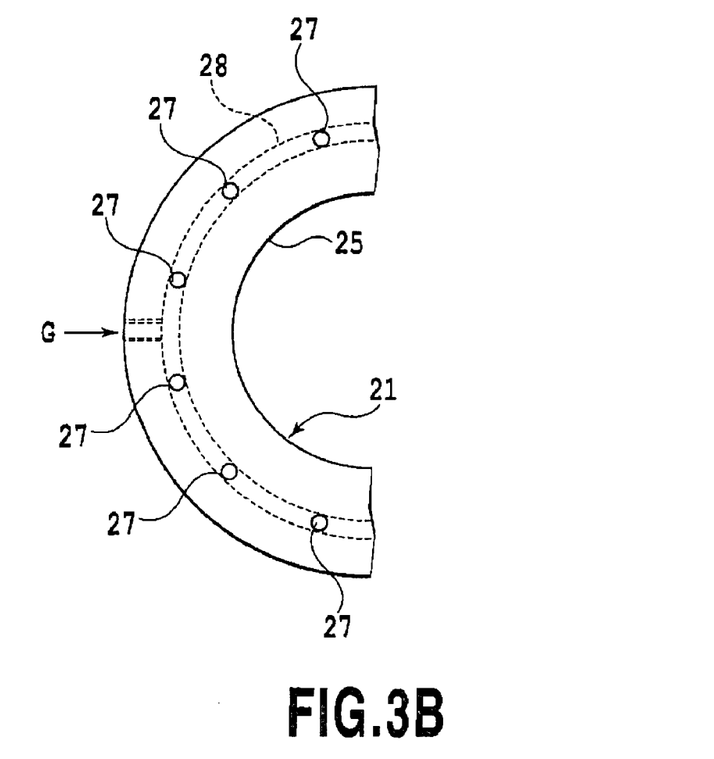
FIG. 3B is a top view of a housing shown in FIG. 2.

Here, FIG. 3A is a cross sectional view of an exemplary structure in the vicinity of the top end of the housing 21, and FIG. 3B is a top view of the structure of the top end of the housing 21.

As shown in FIG. 3B, a plurality of gas ejecting nozzles 27 for supplying an inert gas between the drawing furnace 20 and the first sealing unit 50 are provided along the entire circumference of the top end portion of the drawing furnace 20.

As shown in FIG. 3A, a supply line 28 is formed in the housing 21 communicating with the plurality of gas ejecting nozzles 27. The inert gas G supplied into the supply line 28 is ejected from the gas ejecting nozzles 27.

By ejecting the inert gas G from the ejecting nozzles 27, the first sealing unit slightly floats from a top end surface of the drawing surface 20. As a result, frictional resistance can be reduced when the first sealing unit 50 slides in a transverse direction on the top end surface of the housing 21. As a result, the first sealing unit 50 can smoothly follow a transverse displacement of the optical fiber preform 1.

The coil 23 and the furnace core tube 22 configure a heater for heating the glass preform 1. The furnace core tube 22 is inductively heated by supplying the coil 23 with a high frequency electric current. Carbon is generally used as a material for forming the furnace core tube 22. The carbon is eroded by oxidization when exposed to external air under a high temperature. Accordingly, to prevent external air from flowing into the furnace core tube 22, an inert gas is constantly supplied into the furnace core tube 22 through a not shown inert gas inlet. The inert gas is exhausted from the draw-out opening 26.

As shown in FIG. 2, the first sealing unit 50 includes two annular sealing bodies 60, an annular spacer member 52 for forming a space 52s to be filled with an inert gas G between these annular sealing bodies 60. The spacer member 52 is provided with a gas inlet 53, also known as a gas supplier, for introducing the inert gas G into the space 52s. The spacer member 52 is placed on the top end of the housing 21 so as to transversally move in response to the transversal displacement of the optical fiber preform 1.

Figure 4:
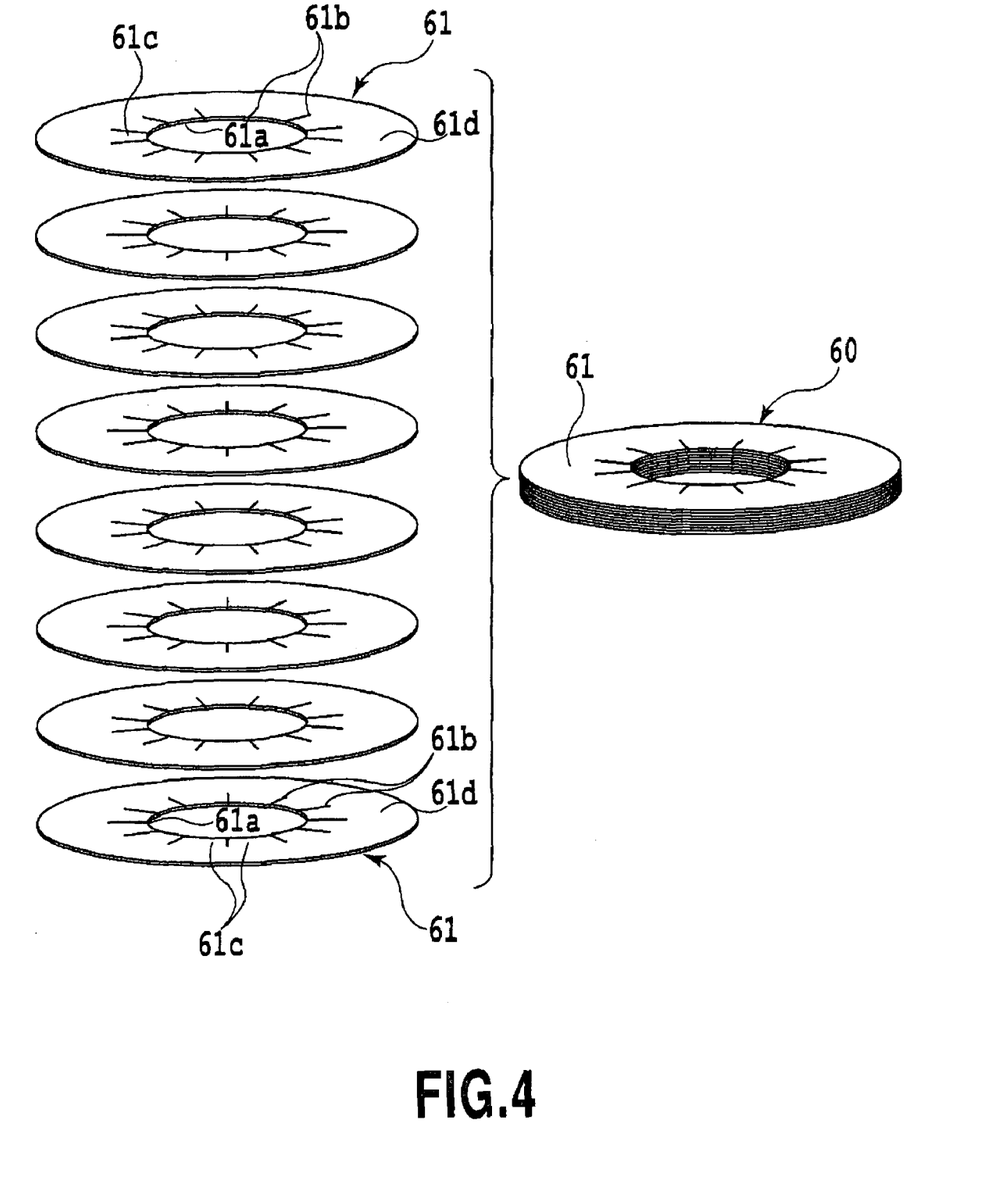
FIG. 4 is a perspective view for illustrating a structure of an annular sealing body according to the embodiment of the present invention.

FIG. 4 illustrates an example of the structure of the annular sealing body 60.

The annular sealing body 60 is configured with a plurality of annular disks 61 having an insertion hole 61a in its central area. The plurality of annular disks 60 are mutually piled or stacked up on each other.

An annular disk 61 has a plurality of slits 61b which are formed to extend from an inner edge of the insertion hole 61a toward its periphery. Additionally, the annular disk 61 has a plurality of flexible portions 61c, which are defined by the plurality of slits 61b, so as to provide flexibility to the disk.

The slits 61b in the annular disk 61, for example, are formed to extend from the inner edge of the insertion hole 61a in radial directions. The slits 61b, for example, are formed at regular angular intervals in the circumferential direction of the annular disk 61. However, the slits 61b are not limited to these examples, and a variety of modifications can be readily made by those skilled in the art.

The annular disk 61 is formed from a heat-resistant material such as a carbon-carbon composite, a graphite sheet, and a heat-resistant metal.

When employing graphite sheet as a material for forming the annular disk 61, it is preferable to use a highly oriented pyrolytic graphite sheet or an expanded graphite sheet. Further, as a heat-resistant metal for forming the annular disk 61, it is preferable to use a metal such as tantalum.

The annular disks 61 have respectively identical structures in the example shown in FIG. 4. However, it is not necessary that the annular disks 61 have respectively identical structures. To improve the sealing efficiency, the annular disks are stacked such that the positions of the slits 61b in one of the annular disks 61 are different from that of the slits in the annular disk adjacent thereto, that is, the slits 61b of the annular disks 61 are not overlapped with each other.

The stacked annular disks 61 are fasten to the spacer member 52 at the periphery portion thereof by fastening means such as clip fastener disposed at the top and bottom sides of the spacer member 52.

The insertion hole 61a of the annular disk 61 is formed so as to be smaller in diameter than the outer diameter of the glass preform 1. Therefore, when the glass preform 1 is inserted into the insertion hole 61a of each of the stacked annular disks 61, the respective flexible portions 61c bend due to an interference with the larger diameter glass preform 1. In this situation, each of the flexible portions 61c responds to any fluctuation of the outer diameter of the glass preform 1, and the amount of deflection also fluctuates. As a result, a condition is established in which each of the flexible portions 61c is always in stable contacts with a surface of the glass preform 1, so that the annular clearance gap between the glass preform insertion opening 25 of the housing 21 and the glass preform 1 is effectively sealed.

The larger the number of annular disk 61 for forming the annular sealing body 60, the higher the sealing efficiency of the annular sealing body 60.

In the present embodiment, by feeding the inert gas G through the gas inlet 53 of the spacer member 52 a space between two coaxially stacked annular sealing bodies 60, an external air flow into the drawing furnace can be effectively blocked. As a result, erosion of the annular disks 61 on the lower side of the sealing body 60 that is caused by an oxide gas from a carbon material can be suppressed. Further, the annular sealing body 60 on the upper side is subject to light shielding and heat shielding, so that radiation heat to which the upper side annular sealing body 60 is subject can be reduced. Accordingly, erosion of the upper side annular disks 61 can also be suppressed.

As shown in FIG. 2, the feed mechanism 80 includes a position adjusting mechanism 81 for adjusting position of the optical fiber preform 1 in X and Y directions, a movable member 82 holding the position adjusting mechanism 81, a shaft 83 connected to the position adjusting mechanism 81 so as to extend in the vertical direction, a connecting mechanism 84 for connecting the shaft 83 with the gripped portion 4 of the optical fiber preform 1, a screw shaft 87 which is rotatably supported the top and bottom ends thereof with supporting members 85 and 86 and screwed into the movable member 82, a motor 88 for rotating the screw shaft 87.

In the feed mechanism 80, the rotation of the screw shaft 87 in a predetermined direction, as driven by the motor 88, moves the movable member 82 downwards so that the optical fiber preform 1, hung at a distal end of the shaft 83 via the connecting mechanism 84, is fed into the drawing furnace 20 through the insertion opening 25.

On the other hand, reverse rotation of the motor with respect to the above predetermined direction moves the movable member 82 upward.

The second sealing unit 70 has a cylindrical member 71 of which the top end is closed and the bottom end is opened. A guide hole 72 is formed at the top end of the cylindrical member 71. Additionally, the cylindrical member 71 is provided with a gas inlet 73 at a side wall thereof.

The shaft 83 connected to the second sealing unit 70, is fitted and inserted into the guide hole 71 of the cylindrical member 71, so that the second sealing unit 70 is movable in the longitudinal directions of the shaft 83, that is, in the moving directions of the optical fiber preform 1. Additionally, the second sealing unit 70 is interconnected with the connecting mechanism 84 so as to be supported at the distal end of the shaft 83. As shown in FIG. 2, the cylindrical member 71 is configured to cover the optical fiber preform 1 from the gripped portion 4 to the tapered portion thereof.

Next, the operation of the above apparatus according to the present invention will be explained.

As shown in FIG. 2, the optical fiber preform 1 is heated and melted in the drawing furnace 20 so that an optical fiber 8 is drawn from a distal end thereof and drawn out from the draw-out opening 26. The drawn optical fiber 8 is covered with a resin by the resin coating device 200, and then taken up to a bobbin by the winding device 300.

The optical fiber preform 1 is fed downwardly by the feed mechanism 80 depending on the drawing process. Accordingly, the second sealing unit 70 gradually moves down together with the optical fiber preform 1. As shown in FIG. 2, when the constant diameter portion 1a of the optical fiber preform 1 is passing through the first sealing unit 50, the second sealing unit 70 is located apart from and above the first sealing unit 50. In this situation, the insertion opening 25 of the drawing furnace 20 is sealed by the only first sealing unit 50 so as to prevent external air from flowing into the drawing furnace 20.

Figure 5:
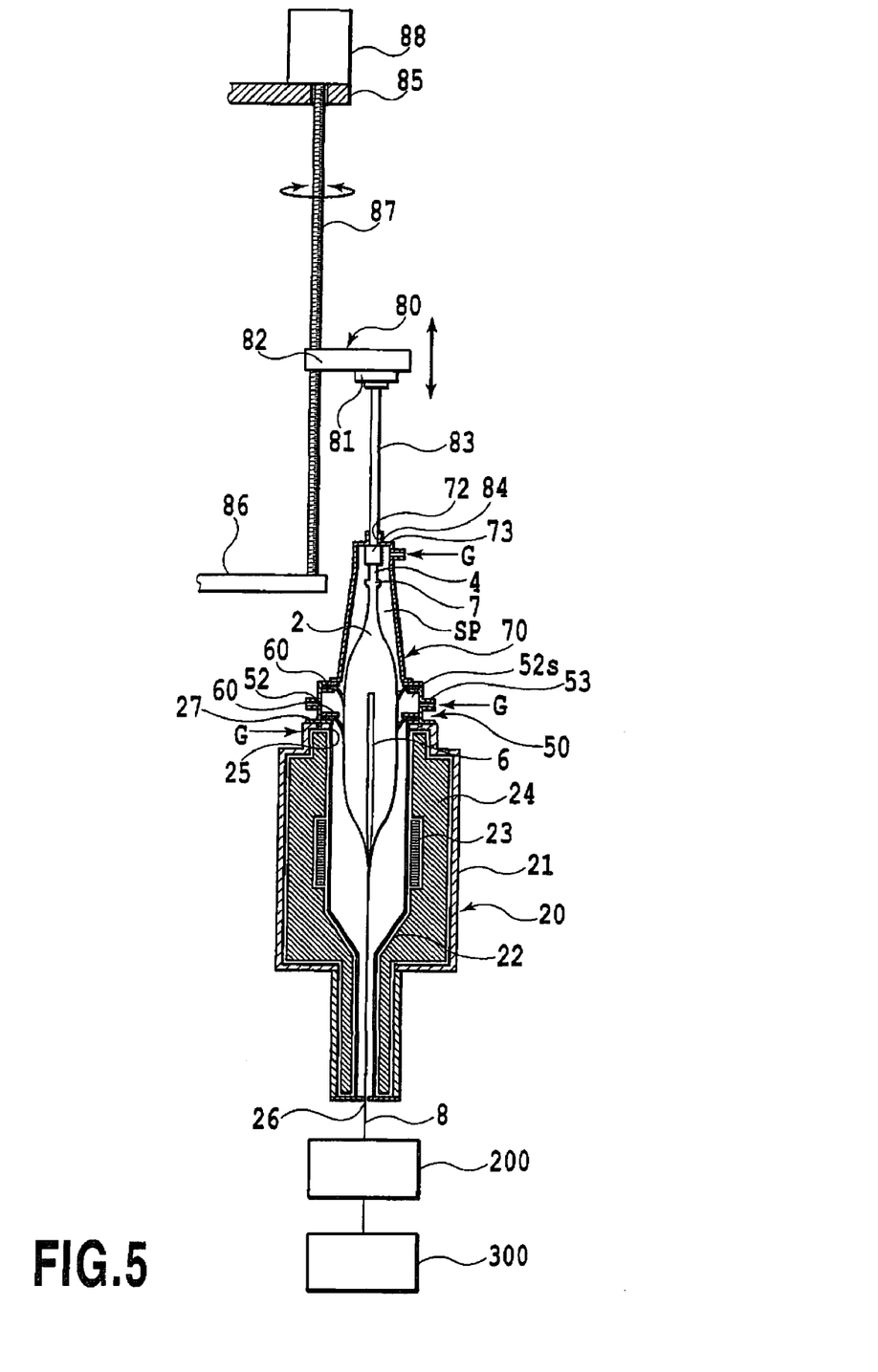
FIG. 5 is a schematic vertical sectional view of the apparatus for fabricating an optical fiber shown in FIG. 2, which shows that the second sealing unit is placed on the top surface of the first sealing unit.

As the drawing process of the optical fiber 8 from the optical fiber preform 1 progresses, as shown in FIG. 5, the bottom end of the second sealing unit 70 reaches the first sealing unit 50 and is placed on the top surface of the first sealing unit 50 before the tapered portion 2 of the optical fiber preform 1 reaches the first sealing unit 50. In this situation, the second sealing unit 70 seals a gap between the first sealing unit 50 and the optical fiber preform 1. That is, the insertion opening 25 of the drawing furnace 20 is sealed by the first sealing unit 50 and the second sealing unit 70. Additionally, as shown in FIG. 5, a closed space SP, formed by a cooperation between the second sealing unit 70 and the first sealing unit 50, is supplied with an inert gas G through the gas inlet 73 so that the closed space is filled with the inert gas G.

The second sealing unit 70 is disengaged from the distal end of the shaft 83 after reaching the first sealing unit 50. As a result, the shaft moves down alone.

Figure 6:
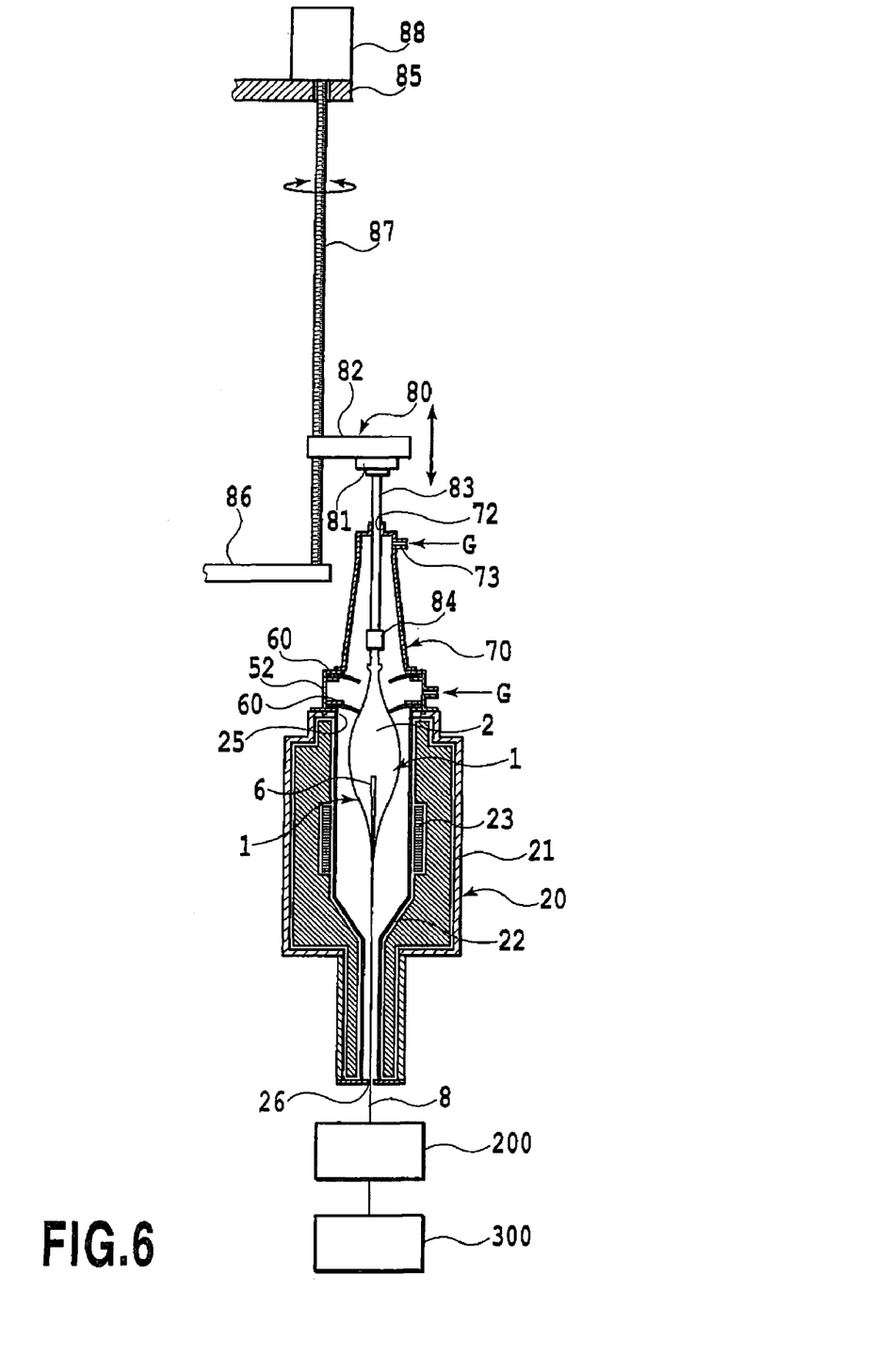
FIG. 6 is a schematic vertical sectional view of the apparatus for fabricating an optical fiber shown in FIG. 2, which shows that a tapered portion at the proximal side of the optical fiber preform is passing through the first sealing unit.

As the drawing process of the optical fiber 8 from the optical fiber preform 1 further progresses, as shown in FIG. 6, the constant diameter portion 1a of the optical fiber preform 1 completely passes through the first sealing unit 50 so that the tapered portion 2 reaches the first sealing unit 50. In this situation, a clearance gap is formed between the tapered portion 2 of the optical fiber preform 1 and the annular sealing body 60 of the first sealing unit 50. The second sealing unit 70, however, already seals the gap between the tapered portion 2 of the optical fiber preform 1 and the first sealing unit 50. As a result, it can reliably prevent external air from flowing into the drawing furnace 20 through the insertion opening 25.

As shown in FIG. 6, when the tapered portion 2 of the optical fiber preform 1 is passing through the first sealing unit 50, it is possible to positively prevent external air from flowing into the drawing furnace 20, so that the core 6 of the optical fiber preform 1 from a distal end to a proximal end thereof can be used for drawing of the optical fiber 8.

In the embodiment described above, the annular sealing bodies were used for the first sealing unit, however, sealing bodies disclosed in Japanese Patent Laid-open No. 2006-342030(corresponding to US 2006/290578A1) or Japanese Patent Laid-open No. 2007-70189 can be alternatively used.

Further, the first sealing unit can be configured with a gas sealing ring having an inner diameter corresponding to an outer diameter of a preform.

In the embodiment described above, a configuration in which the feed mechanism for feeding the preform transfers the second sealing unit was disclosed, however, a configuration in which a transfer mechanism separate from the feed mechanism transfers the second sealing unit can be employed.

Having described preferred embodiments of the invention with reference to the accompanying drawings, it is to be understood that the invention is not limited to the precise embodiments, and that various changes and modifications may be effected therein by those skilled in the art without departing from the scope or spirit of the invention as defined by appended claims.

What is claimed is:

1. An apparatus for fabricating an optical fiber, comprising:
   a drawing furnace provided with an opening for receiving an optical fiber preform;
   a feed mechanism configured to feed said optical fiber preform into said drawing furnace while supporting one end thereof;
   a sealing unit configured to seal a clearance gap between said optical fiber preform and said opening; and
   a cover member configured to move to the sealing unit when a tapered portion formed at an end side of said optical fiber preform passes through said opening so as to cover an opening of the sealing unit while surrounding the tapered portion of said optical fiber preform,
   wherein the cover member comprises a gas inlet for supplying an inert gas into a closed space surrounded by the cover member.

2. The apparatus for fabricating an optical fiber according to claim 1, wherein the cover member is capable of moving toward the drawing furnace while being supported by a movable portion of said feed mechanism, and is capable of being disengaged from said movable portion after contacting with said first sealing unit.

3. The apparatus for fabricating an optical fiber according to claim 1, wherein the cover member is movably supported by a movable portion of said feed mechanism in the moving direction of said optical fiber preform.

4. The apparatus for fabricating an optical fiber according to claim 1, wherein the cover member is configured to cover said optical fiber preform at least from an end supported by a movable portion of said feed mechanism to said tapered portion thereof.

5. The apparatus for fabricating an optical fiber according to claim 4, wherein the cover member reaches said first sealing unit when said tapered portion of said optical fiber preform reaches said first sealing unit.

6. The apparatus for fabricating an optical fiber according to claim 1, wherein said first sealing unit comprises a plurality of annular sealing bodies configured to seal said clearance gap between said optical fiber preform and said opening; wherein said annular sealing bodies comprise a plurality of annular disks;
   wherein each of said plurality of annular disks comprises an insertion hole in a central area of the disk;
   a plurality of slits formed to extend from an inner edge of said insertion hole toward an outer periphery of the disk; and
   a plurality of flexible portions defined by said plurality of slits and configured to bend due to an interference fit with said optical fiber preform when said optical fiber perform is inserted into said insertion hole.

7. The apparatus for fabricating an optical fiber according to claim 1, wherein the sealing unit is arranged on said drawing furnace transversely movable in response to a transversal displacement of said optical fiber preform, and said drawing furnace includes a gas supplier configured to supply an inert gas between said first sealing unit and said drawing furnace.

* * * * *